E. R. BAILEY.
CREAM SEPARATOR.
APPLICATION FILED AUG. 17, 1911.
1,029,785.
Patented June 18, 1912.
2 SHEETS—SHEET 1.
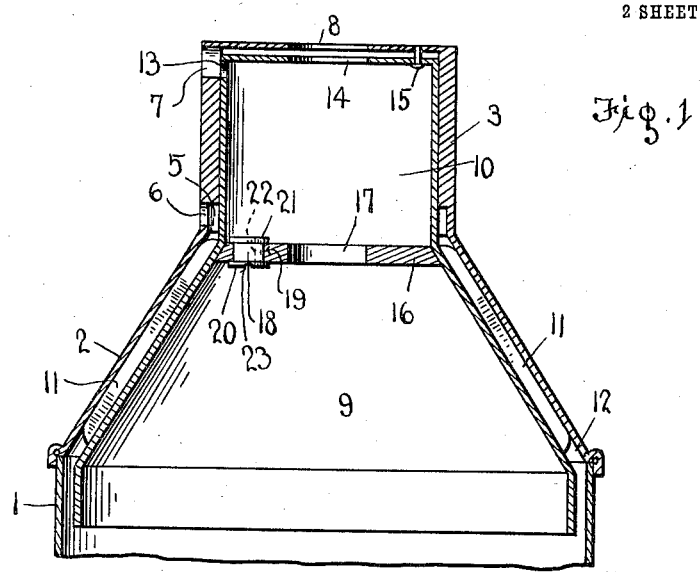
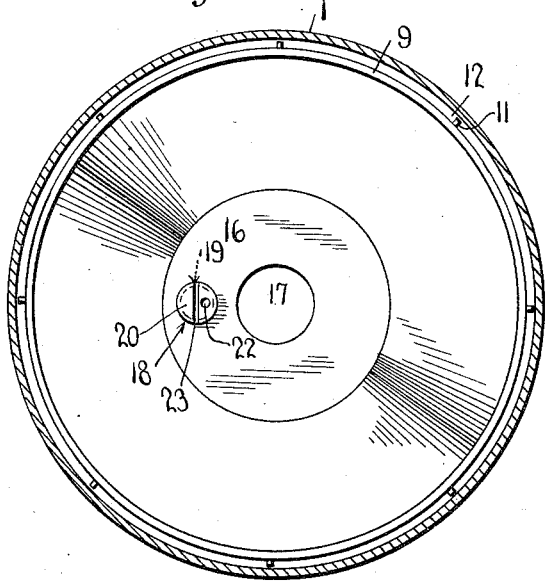
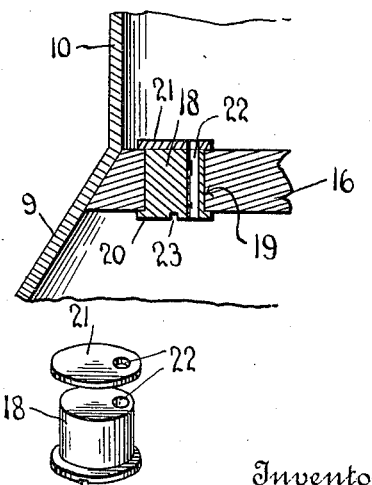
Witnesses
L. B. James
C. E. Hunt
Inventor
E. R. Bailey
by H. B. Willson &co
Attorneys E. R. BAILEY.
CREAM SEPARATOR.
APPLICATION FILED AUG. 17, 1911.
1,029,785.
Patented June 18, 1912.
2 SHEETS—SHEET 2.
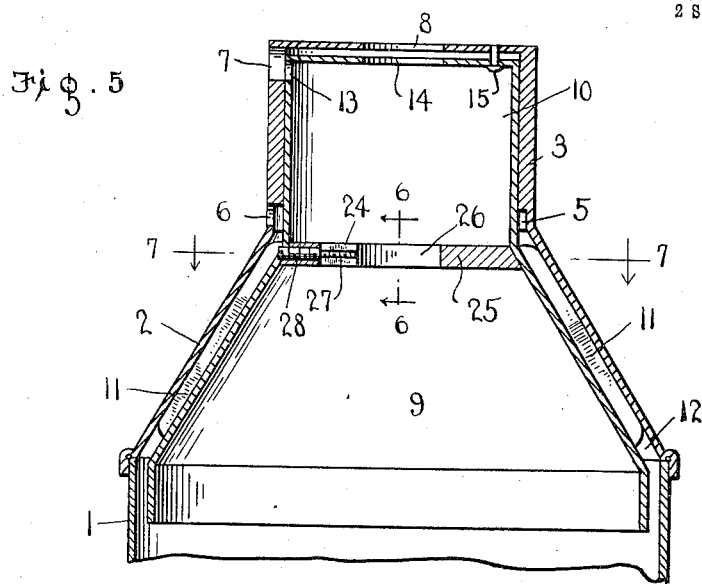
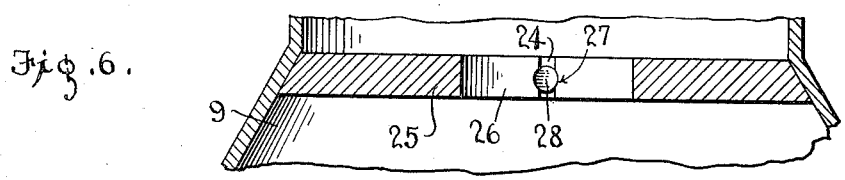
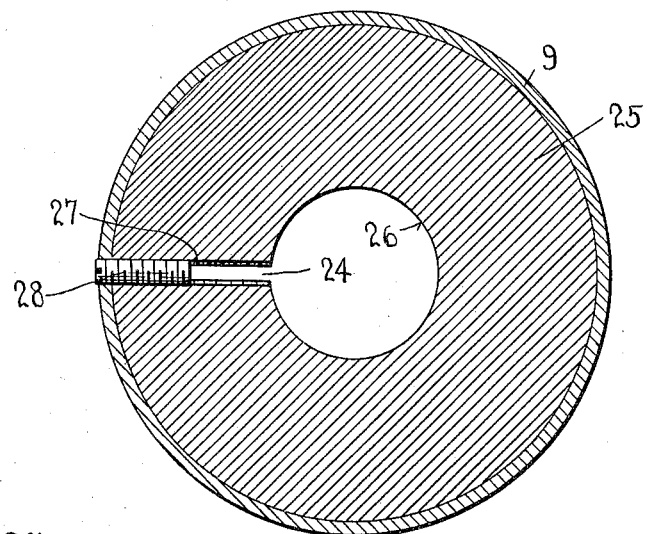
Witnesses
L. B. James
C. E. Hunt
Inventor
E. R. Bailey
by H. B. Willson & Co
Attorneys

UNITED STATES PATENT OFFICE.

EDGERLY R. BAILEY, OF CLARINDA, IOWA.

CREAM-SEPARATOR.

1,029,785.  Specification of Letters Patent.  Patented June 18, 1912.

Application filed August 17, 1911. Serial No. 644,596.

*To all whom it may concern:*

Be it known that I, EDGERLY R. BAILEY, a citizen of the United States, residing at Clarinda, in the county of Page and State of Iowa, have invented certain new and useful Improvements in Cream - Separators; and I do declare the following to be a full, clear, and exact description of the invention, such as will enable others skilled in the art to which it appertains to make and use the same.

This invention relates to improvements in cream separators.

One object of the invention is to provide a cream separator having an improved construction and arrangement of skimming cone and cream regulating mechanism whereby the density of the cream may be controlled and the desired percentage of butter fat thus obtained.

A further object is to improve and simplify the construction and to increase the efficiency of the separator shown in United States Patent No. 934,706 granted to myself and M. A. Ganiard, September 24, 1909.

With these and other objects in view, the invention consists of certain novel features of construction, and the combination and arrangement of parts as will be more fully described and claimed.

In the accompanying drawings: Figure 1 is a central vertical sectional view of the upper end of a separator showing my improved skimming cone and regulating mechanism applied thereto; Fig. 2 is a horizontal sectional view looking upward toward the inner side of the skimming cone shown in Fig. 1; Fig. 3 is an enlarged vertical sectional view through a portion of the skimming cone and the cream regulating mechanism shown in Figs. 1 and 2; Fig. 4 is a detail perspective view of the cream regulating mechanism removed from the cone; Fig. 5 is a view similar to Fig. 1 showing a modified form of the cream regulating mechanism; Fig. 6 is an enlarged vertical sectional view through a portion of the skimming cone taken on the line 6—6 of Fig. 5; and, Fig. 7 is an enlarged horizontal sectional view on the line 7—7 of Fig. 5.

Referring more particularly to the drawings, 1 denotes the upper portion of a cream separator bowl, 2 denotes the cap which is removably engaged with the upper end of the bowl and which may be of the usual or any preferred construction. On the upper end of the cap 2 is a cylindrical extension 3 the upper portion of which is of greater thickness than its lower portion thereby forming an annular milk receiving space 5. Opening through one side of the extension 3 and communicating with the annular milk space 5 is a milk discharging passage 6. In the upper portion of the extension 3 above the milk discharging passage 6 is a cream discharging passage 7. In the top of the extension 3 is formed a centrally disposed passage 8 through which the usual tubular separator supporting and milk conducting shaft (not shown) passes.

Arranged in the upper portion and cap of the separator is my skimming cone, said cone comprising a frusto-conical shaped body portion 9 having on its upper end a cylindrical extension 10 which projects up into the cylindrical upper portion of the cap as shown. On the frusto-conical body portion 9 of the cone are arranged outwardly projecting spacing ribs 11 which engage the inner surface of the adjacent portion of the cap and thus hold these parts in spaced relation to form a milk space or passage 12 up which and into the space 5 the milk is driven by the centrifugal force of the separator.

In one side of the cylindrical upper portion 10 of the separator, and registering with the cream discharging passage in the cylindrical extension 3 of the cap, is formed a cream discharging passage 13 through which the cream is discharged from the skimming cone. In the top of the extension 10 of the cone is formed a centrally disposed passage 14 which alines with the passage 8 in the extension 3 of the cap and through which the tubular supporting and milk conducting shaft is adapted to pass.

Arranged in one side of the top of the extension 10 of the cone is an upwardly projecting stud 15 which is adapted to be engaged with an aperture in the top of the extension 3 of the cap whereby said cone is held in proper position in the cap of the separator bowl.

Arranged in the upper portion of the conical shaped body 9 of the skimming cone, adjacent to the lower end of the cylindrical extension 10, is a transverse horizontally disposed partition or baffle plate 16 in which is formed a centrally disposed passage 17. The passage 17 alines with the passages 8 and 14 in the extensions 3 and 10 of the cap and cone and is adapted to receive the tubular milk conducting shaft or top of the separator.

In the first four figures of the drawings is shown one form of my improved cream regulating mechanism, said mechanism being shown in this instance as consisting of a cylindrical plug 18 which is revolubly mounted in a cylindrical passage 19 formed in the partition or baffle plate 16 adjacent to one side of the skimming cone as shown. The plug 18 is provided on its lower end with an annular flange 20 which engages the under side of the partition 16. The plug corresponds in length to the thickness of the plate 16 and to the upper end of the plug is secured a circular retaining plate 21 the edges of which project beyond the sides of the plug and engage the upper side of the partition 16 and thus revolubly support the plug 18 in the passage 19 as shown. Through one side of the plug and the adjacent portion of the retaining plate 21 is formed a cream passage 22 through which the cream is adapted to pass when forced up into the upper portion of the cone. After passing through the passage 22 the cream is forced upwardly in the extension 10 of the cone and is forced out through the discharge passages 13 and 7 in the upper portion of the extensions 10 and 3 of the cone and cap of the separator. In the lower side of the plug 18 is formed a notch 23 with which is adapted to be engaged a screw driver or other instrument by means of which the plug is turned to bring the discharge passage 22 nearer to or farther from the center of the cone thereby regulating the density of the cream discharged from the cone.

In the last three figures of the drawings is shown a modified construction of the cream regulating mechanism, said mechanism being shown in this instance as consisting of a radially disposed slot 24 which is formed in the partition or baffle plate 25 which corresponds to the baffle plate or partition 16 of the first form of the device and which is arranged in a similar position in the upper end of the cone. The slot 24 opens through the passage 26 in the center of the baffle plate 25 through which the tubular supporting and cream conducting shaft passes. In the plate 25 in line with the slot 24 and opening through the outer edge of the plate and the adjacent side of the cone is a threaded passage or screw hole 27 the inner portion of which intersects the sides of the slot 24 as shown. Adapted to be screwed into the threaded passage 27 is a regulating screw 28 which, when screwed inwardly or outwardly regulates the length of the slot 24 and thus controls the passage of the cream from the cone to the extension on the upper end thereof. By thus adjusting the screw the cream is permitted to discharge at a greater or less distance from the center of the cone thereby regulating the density of the cream.

A skimming cone and cream separating device constructed as herein shown and described may be readily separated and the parts thoroughly cleansed after being used, thus enabling the separator to be kept in a thoroughly clean and sanitary condition which will result in the production of cream free from impurities or contamination. The adjustable feature of the separating mechanism also provides for the accurate grading or regulating of the cream to any desired density.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is:

1. In a cream separator, a main cylindrical body, an extension in the form of a conic frustum removably secured on the top thereof, a cylindrical extension of reduced diameter at the top of the frustum, said reduced cylindrical extension having thickened walls with a discharge opening in one side at the top thereof, the increase of said wall extending inwardly, and a flat top with a central receiving opening, a skimming cone within the frusto conical portion of the body having outwardly projecting ribs whereby it is spaced apart from said frusto-conical portion, an upper cylindrical extension fitted in the upper vertical extension of the body between its thickened walls having a discharge opening registering with that of the body extension and having a flat top secured to the top of the cylindrical extension of the body and a receiving opening registering with the receiving opening in the top of the body extension, said vertical extension of the body being provided with a milk discharge outlet at the upper end of the space between it and the skimming cone, and a baffle plate at the junction of the skimming cone with its cylindrical extension having a receiving opening registering with those of the two flat tops, and an opening for the discharge of cream into the cylindrical extension of the skimming cone.

2. In a cream separator having a skimming cone with a vertical extension, a baffle plate at the junction of the cone and its extension having an opening near its periphery, and a rotatable plug in said opening provided with annular flanges at top and bottom bearing on the top and bottom of the baffle plate and having an eccentrically located opening for the discharge of cream adjustable toward and away from the axis of the cone by turning the plug.

In testimony whereof I have hereunto set my hand in presence of two subscribing witnesses.

EDGERLY R. BAILEY.

Witnesses:
 CLARA B. ROYCE,
 J. W. BERRY.

Copies of this patent may be obtained for five cents each, by addressing the "Commissioner of Patents, Washington, D. C."